I. A. WILLIAMS.
QUICK ACTION MICROMETER.
APPLICATION FILED JULY 21, 1915.
1,200,679.
Patented Oct. 10, 1916.
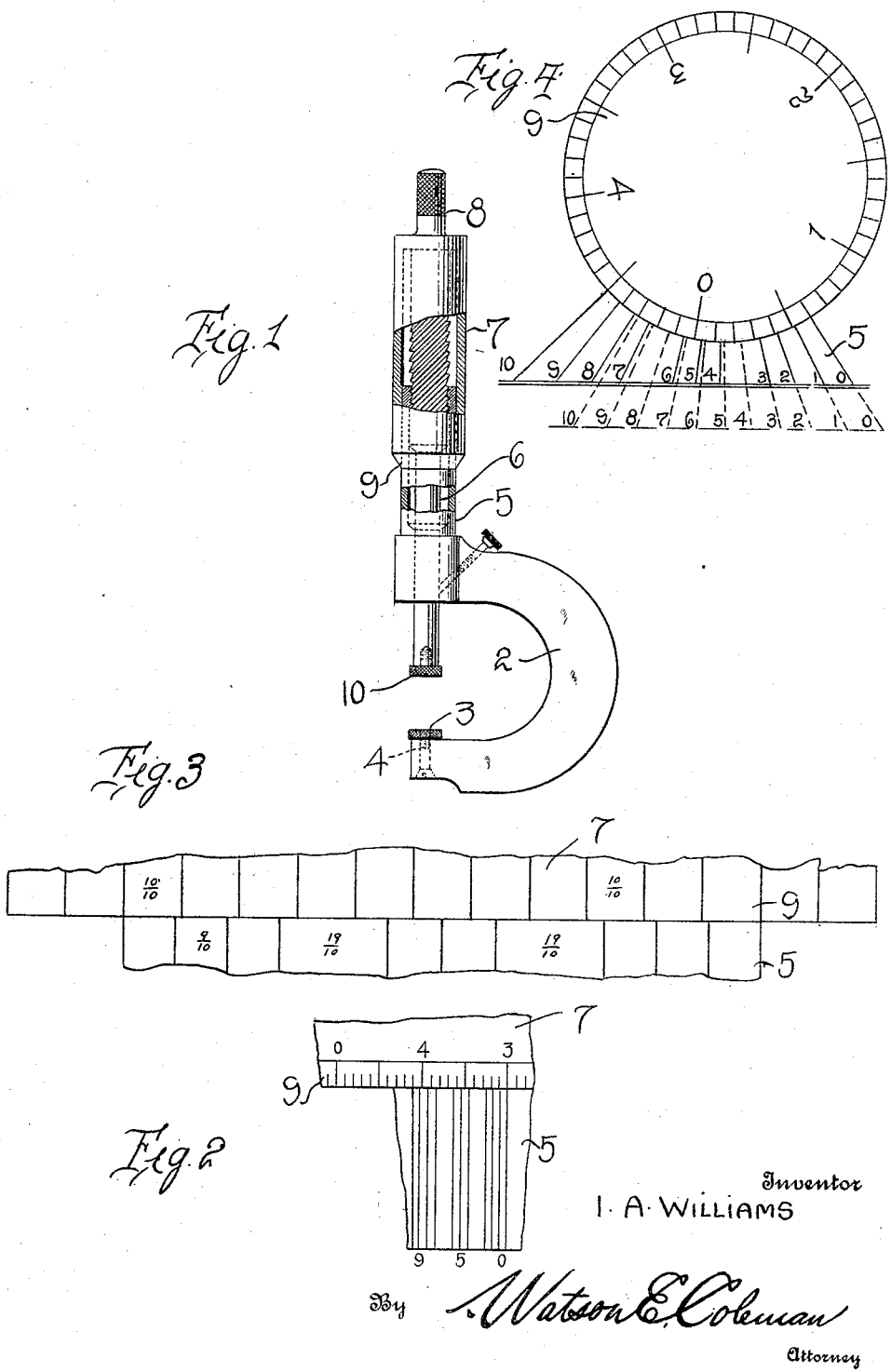
Inventor
I. A. WILLIAMS
By Watson E. Coleman
Attorney

UNITED STATES PATENT OFFICE.

IVAN A. WILLIAMS, OF CORVALLIS, OREGON.

QUICK-ACTION MICROMETER.

1,200,679.  Specification of Letters Patent.  Patented Oct. 10, 1916.

Application filed July 21, 1915. Serial No. 41,147.

*To all whom it may concern:*

Be it known that I, IVAN A. WILLIAMS, a citizen of the United States, residing at Corvallis, in the county of Benton and State of Oregon, have invented certain new and useful improvements in Quick-Action Micrometers, of which the following is a specification, reference being had to the accompanying drawings.

This invention relates to micrometers, and particularly to the construction of a micrometer head.

The primary object of my invention is the provision of a micrometer head in which the pitch of the coacting screw threads on the sleeve and on the spindle is such that the spindle may be shifted longitudinally through the sleeve and at the same time rotated by pressure applied to one end of the screw or spindle whereby the spindle may either be quickly set to engage an object or will be opened by pressure on the end of the spindle, whereby the spindle will be moved back when an irregular object is rotated against the spindle, thus obviating all danger of springing the instrument when using it in connection with rotating work.

A further object of the invention is to provide removable work-engaging tips; and still another object is to so arrange and group measuring indices or vernier lines on the spindle that the different lines may be located without the use of numerals.

Other objects will appear in the course of the following description.

My invention is illustrated in the accompanying drawings, wherein:

Figure 1 is an elevation of a micrometer constructed in accordance with my invention, the thimble and sleeve being partly broken away; Fig. 2 is a fragmentary elevation of a portion of the thimble and a coacting portion of the sleeve to show the graduation marks thereon; Fig. 3 is a projection of a portion of the thimble and of the coacting portion of the sleeve to show the detailed arrangement of the vernier lines or graduations; Fig. 4 is a diagrammatic plan view of the graduations on the thimble and sleeve, the view also showing in dotted lines the ordinary graduations on the sleeve.

Referring to these figures, 2 designates the U-shaped frame commonly used with micrometers of the character illustrated, one end of which is provided with the work engaging tip 3 having a stud 4 engaging with a screw threaded perforation in the extremity of the frame. The other end of the frame is tubular and provided with the outwardly extending sleeve 5, which sleeve is interiorly screw threaded. Operating within the screw threaded sleeve 5 is a spindle 6 which is screw threaded to coact with the sleeve 5, and carried upon the end of the sleeve is a thimble 7 which is tubular in form and has an interior diameter identical with the exterior diameter of the sleeve 5. This thimble 7 at its upper end is provided with the head 8 whereby it may be readily manipulated, and the lower end of the annular thimble is beveled, as at 9, so as to present a downwardly converging face upon which certain indices or vernier marks are disposed, as will be later stated. The lower extremity of the spindle is provided with a removable tip 10 having a central screw threaded stud engaging the lower end of the spindle.

As before stated, one object of my invention is to so construct the micrometer that the spindle 6 may be moved in either direction very quickly upon pressure being applied to one or the other end of the spindle, and to this end the coacting screw threads of the sleeve 5 and the spindle 6 are of a very rapid or steep pitch. In actual practice this pitch will be greater than the critical angle of friction. In other words the pitch will be such that pressure upon the end of the spindle 6 will cause it to revolve within the sleeve 5 and cause it to move longitudinally within the sleeve. I have shown in the drawing these screw threads as being quadruple and having a pitch of .500″. It will thus be seen that the complete rotation of the spindle will be secured for each movement of half an inch of the spindle relative to the sleeve. By forming the spindle and sleeve with screw threads having a pitch greater than the critical angle of friction, I not only can secure a very rapid adjustment of the spindle of the micrometer by forcing the thimble 7 toward the tip 3, but if the micrometer be used in measuring an irregular object which is being rotated between the tips 3 and 10, the spindle will move back under the pressure of the increasing diameter of the object.

The beveled face 9 of the thimble is divided by indices or graduations, and as illustrated there are fifty of these graduations on this beveled face divided into groups of ten graduations each. It will be obvious therefore that if the pitch of the screw is .500″ and there are fifty divisions, then each division will be equal to .01″. The sleeve 5 is formed with graduations which in the figures are shown as being ten in number, and running from zero to 9. These graduations are grouped so that the first group contains lines corresponding with zero, 1, 2 and 3. There are then two spaces and a second group is provided of three lines corresponding to 4, 5 and 6. The seventh line is two spaces beyond the sixth line and with it are grouped the lines 8 and 9. The object of this grouping is to locate the different lines without the use of numerals.

It will be noted from Fig. 3 that the graduations on the barrel or sleeve 5 are spaced apart $\frac{9}{10}$ the distance of those on the thimble, and the distance between the groups of graduation marks is equal to 1 and $\frac{9}{10}$ of the distance between the graduations on the thimble. If the sum of the distances of the lines on the barrel or sleeve were added together, they equal the combined distance of 10 and $\frac{1}{10}$ graduations on the thimble, and if another line were drawn on the barrel or sleeve it would exactly coincide with the next line on the thimble. Of course I do not wish to be limited to the exact grouping shown in Figs. 2 and 3 as this grouping may be varied and yet secure the same result.

While I have illustrated my device as applied to a micrometer of a certain definite construction and comprising a U-shaped frame, one leg of which supports the stationary sleeve or barrel 5, yet I do not wish to be limited to this application of the principle of my invention as this principle might be applied to micrometers of a different construction, as for instance, depth gage or inside micrometers, and I wish it distinctly understood that the application of this principle to any measuring device which will include a screw threaded sleeve or barrel and a coacting screw threaded stem or spindle would be within the scope of my invention. Thus my invention may be readily applied to what are known as micrometer heads which are not mounted upon a frame but which are adapted to be attached to tools and machines where fine measurements are required, these micrometer heads comprising a screw threaded spindle and a screw threaded relatively fixed member with which the spindle engages, this screw threaded barrel and its spindle by my invention having coacting threads of such pitch that the spindle will move longitudinally through the fixed member and simultaneously rotate by longitudinal pressure applied to its end.

Having thus described my invention, what I claim is:

1. In a measuring instrument, a screw threaded spindle, and a screw threaded, graduated relatively fixed member with which the spindle engages, the threads being of such pitch that the spindle will move longitudinally through the fixed member and simultaneously rotate by longitudinal pressure applied to its end, the spindle having a part movable over the fixed member and having graduations coacting with the graduations on the fixed member.

2. In a micrometer head, a screw threaded spindle, a graduated screw threaded sleeve with which the spindle coacts, the threads on the spindle and sleeve being of such pitch that the spindle and sleeve will relatively move longitudinally and simultaneously rotate by pressure applied to the spindle in the direction of its length, said spindle having a part movable with it relative to the sleeve, said part having graduations coacting with the graduations on the sleeve.

3. In a micrometer head, a screw threaded spindle and a graduated screw threaded sleeve with which the spindle coacts, the screw threads having a pitch greater than the critical angle of friction, the spindle having a part movable with the spindle over the fixed member and having graduations coacting with the graduations on the fixed member.

4. In a micrometer, a frame including a screw threaded graduated sleeve and a work engaging leg, and a spindle passing through the sleeve and opposed to the extremity of the leg, the spindle and sleeve having coacting screw threads, said threads having a pitch greater than the critical angle of friction, the spindle having a part movable with it relative to the sleeve having graduations coacting with the graduations on the sleeve.

5. In a micrometer, a frame including a screw threaded graduated sleeve, a spindle mounted in said sleeve and having coacting screw threads, and a thimble attached to one extremity of the spindle and extending parallel thereto but spaced therefrom to surround the sleeve, the screw threads of the sleeve and spindle having a pitch greater than the critical angle of friction, the thimble having graduations coacting with the graduations on the sleeve.

6. A micrometer head including a relatively fixed sleeve and a thimble rotatable with relation to the sleeve and longitudinally movable with relation thereto, the thimble having thereon a circular series of graduations, the sleeve having thereon a coacting series of graduations, said graduations on the sleeve being in groups whereby the different graduations may be located and their succession apprehended without the use of numerals.

7. A micrometer head including a relatively fixed sleeve and a thimble rotatable with relation to the sleeve and longitudinally movable with relation thereto, the thimble having thereon a circular series of graduations extending at spaced distances entirely around the thimble, a sleeve having thereon a coacting series of graduation lines, said graduation lines extending longitudinally of the sleeve and being arranged in groups whereby the different graduations may be located and their succession apprehended without the use of numerals.

8. A micrometer head including a relatively fixed member and a member rotatable with relation to the fixed member and longitudinally movable with relation thereto, the last named member having thereon a circular series of graduations thereon disposed at uniformly spaced distances, the fixed member having thereon a coacting series of graduations extending longitudinally thereof and being arranged in groups, the distances between the last named graduations being a fractional part of the distances between the first named graduations, the distances between the groups of graduations being greater than the total of any two spaces of the same group but less than any two spaces of the first named graduations whereby the different graduations may be located and their succession apprehended without the use of numerals.

9. A micrometer head including a screw threaded graduated sleeve, a spindle mounted on the sleeve and having coacting screw threads, said threads having a pitch greater than the critical angle of friction, and a thimble attached to one extremity of the spindle extending parallel thereto but spaced therefrom to surround the sleeve having graduations coacting with the graduations on the sleeve.

10. A micrometer including a stationary and a rotatable member having screw threaded engagement with each other, the screw threads having a pitch greater than the critical angle of friction, the fixed and rotatable members having coöperating circumferentially disposed graduations.

In testimony whereof I hereunto affix my signature in the presence of two witnesses.

IVAN A. WILLIAMS.

Witnesses:
W. J. KENT,
OSCAR MIDDLEKAUFF.

Copies of this patent may be obtained for five cents each, by addressing the "Commissioner of Patents, Washington, D. C."